United States Patent [19]

Altermatt

[11] 4,148,791
[45] Apr. 10, 1979

[54] PHENYL-AZO-PHENYL COMPOUNDS HAVING AT LEAST ONE HYDROXY OR OXO SUBSTITUENT ON A SULFINYL OR SULFAMOYL GROUP IN THE PARA POSITION OF THE DIAZO COMPONENT RADICAL

[75] Inventor: Ruedi Altermatt, Buckten, Switzerland

[73] Assignee: Sandoz Ltd., Basle, Switzerland

[21] Appl. No.: 830,414

[22] Filed: Sep. 6, 1977

Related U.S. Application Data

[63] Continuation-in-part of Ser. No. 700,835, Jun. 29, 1976, abandoned.

[30] Foreign Application Priority Data

Jul. 4, 1975 [CH] Switzerland .................. 8744/75

[51] Int. Cl.$^2$ .................. C09B 29/08; C09B 29/26
[52] U.S. Cl. .................. 260/207.1; 260/205; 260/206; 260/207; 260/207.5; 260/208
[58] Field of Search ............ 260/205, 206, 207, 207.1

[56] References Cited

U.S. PATENT DOCUMENTS

| 2,151,857 | 3/1939 | Manz et al. ..................... 260/205 |
| 3,050,516 | 8/1962 | Merian et al. ................. 260/207.1 |

FOREIGN PATENT DOCUMENTS

| 1935482 | 2/1970 | Fed. Rep. of Germany ........ 260/207.1 |
| 1943056 | 3/1971 | Fed. Rep. of Germany ........ 260/207.1 |

*Primary Examiner*—Charles E. Warren
*Attorney, Agent, or Firm*—Gerald D. Sharkin

[57] ABSTRACT

Compounds of the formula

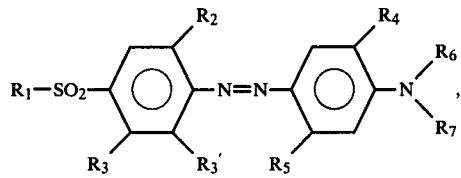

in which
$R_1$ is —CH$_2$CH$_2$OH, —CH$_2$CHOHCH$_2$OH, —CH$_2$COCH$_3$, —CH$_2$COC$_6$H$_5$, —CH$_2$COC$_6$H$_4$Br or —NR$_8$R$_9$,
$R_2$ is halogen or cyano,
one of $R_3$ and $R_3'$ is hydrogen and the other is hydrogen or halogen,
$R_4$ is hydrogen, chloro, bromo, methyl, methoxy or ethoxy,
$R_5$ is chloro, bromo, cyano, acylamino, methyl, methoxy or ethoxy, with the proviso that, when $R_5$ is methyl, methoxy or ethoxy, $R_1$ is other than —NR$_8$R$_9$,
$R_6$ is (C$_{1-4}$) alkyl or (C$_{2-4}$) alkenyl,
$R_7$ is (C$_{1-4}$) alkyl, (C$_{2-4}$) alkenyl or phenyl (C$_{1-2}$) alkyl,
$R_8$ is hydroxy (C$_{2-3}$) alkyl, and
$R_9$ is hydrogen, (C$_{1-4}$) alkyl, hydroxy (C$_{2-3}$) alkyl or cyano (C$_{1-2}$) alkyl, with the proviso that the molecule is free from

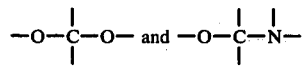

groups, are useful as disperse dyes for synthetic and semi-synthetic, hydrophobic, high molecular weight organic substrates such as linear, aromatic polyesters, cellulose 2/178 acetate, cellulose triacetate and synthetic polyamides. The obtained dyeings possess notable fastness to light, thermofixation, sublimation, pleating, wet treatments, solvents, cross-dyeing, ozone, gas fumes, chlorine and rubbing.

33 Claims, No Drawings

PHENYL-AZO-PHENYL COMPOUNDS HAVING AT LEAST ONE HYDROXY OR OXO SUBSTITUENT ON A SULFINYL OR SULFAMOYL GROUP IN THE PARA POSITION OF THE DIAZO COMPONENT RADICAL

This application is a continuation-in-part of application Ser. No. 700,835, filed June 29, 1976 and now abandoned.

The present invention relates to azo compounds, their preparation and use.

More particularly, the present invention provides compounds of formula I

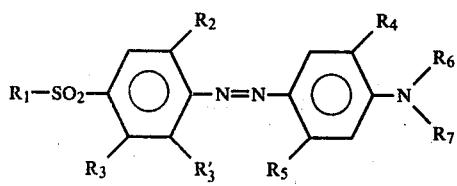

in which
$R_1$ is $-CH_2CH_2OH$, $-CH_2CHOHCH_2OH$, $-CH_2COCH_3$, $-CH_2COC_6H_5$, $-CH_2COC_6H_4Br$ or $-NR_8R_9$,
$R_2$ is halogen or cyano, preferably halogen,
one of $R_3$ and $R_3'$ is hydrogen and the other is hydrogen or halogen,
$R_4$ is hydrogen, chloro, bromo, methyl, methoxy or ethoxy,
$R_5$ is chloro, bromo, cyano, acylamino, methyl, methoxy or ethoxy, preferably acylamino as defined below, with the proviso that, when $R_5$ is methyl, methoxy or ethoxy, $R_1$ is other than $-NR_8R_9$,
$R_6$ is $(C_{1-4})$alkyl or $(C_{2-4})$alkenyl,
$R_7$ is $(C_{1-4})$alkyl, $(C_{2-4})$alkenyl or phenyl$(C_{1-2})$ alkyl,
$R_8$ is hydroxy$(C_{2-3})$alkyl, and
$R_9$ is hydrogen, $(C_{1-4})$alkyl, hydroxy$(C_{2-3})$alkyl or cyano$(C_{1-2})$alkyl,
with the proviso that the molecule is free from

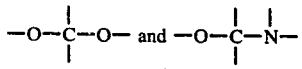

groups.

By halogen is meant fluorine, bromine, iodine and chlorine, with chlorine and bromine being preferred.

By 'acyl' in acylamino is meant formyl; trifluoroacetyl; $(C_{1-4})$alkylcarbonyl; $(C_{1-4})$alkoxycarbonyl; $(C_{2-4})$alkenylcarbonyl; $(C_{2-4})$alkenyloxycarbonyl; benzoyl; mono$(C_{1-2})$alkyl substituted benzoyl; phenoxycarbonyl; $(C_{1-4})$alkylcarbonyl and $(C_{1-4})$alkoxycarbonyl in which the alkyl or alkoxy groups are substituted by up to two substituents selected from chlorine and bromine atoms and hydroxy groups or monosubstituted by cyano, $(C_{1-4})$alkoxy, $(C_{1-2})$alkoxy$(C_{2-4})$-alkoxy, benzyloxy, phenyl or phenoxy; $(C_{1-4})$alkylsulphonyl; cycloalkyloxycarbonyl; mono$(C_{1-4})$alkyl substituted cycloalkyloxycarbonyl or dioxanylmethoxycarbonyl. Any cycloalkyl in the foregoing is of 5 to 7 ring carbon atoms.

Where $R_1$ is $-CH_2COC_6H_4Br$, preferably the bromine is in the para position.

Where $R_2$ signifies halogen, preferably such halogen is chlorine, bromine or iodine, with chlorine and bromine being more preferred.

Where one of $R_3$ and $R_3'$ is halogen, preferably such halogen is chlorine or bromine.

Where $R_5$ is substituted alkylcarbonylamino, preferably the alkyl moiety is substituted by up to two substituents selected from chlorine and bromine atoms and hydroxy groups or or monosubstituted by cyano, $(C_{1-2})$alkoxy, benzyloxy, phenyl or phenoxy. Where $R_5$ is a substituted $(C_{1-4})$alkoxycarbonylamino group, preferably such group is monosubstituted by chlorine, bromine, $(C_{1-2})$alkoxy, $(C_{1-2})$alkoxy$(C_{2-3})$alkoxy, or phenoxy, the preferred $(C_{1-2})$alkoxy$(C_{2-3})$alkoxy group being methoxyethoxy. Where $R_5$ is an alkyl substituted phenylcarbonylamino group, preferably it is tolylcarbonylamino. Where $R_5$ is alkenyloxycarbonylamino or alkenylcarbonylamino, the alkenyl group preferably contains 2 or 3 carbon atoms, preferred such groups being allyloxycarbonylamino, methylvinylcarbonylamino, vinylcarbonylamino and allylcarbonylamino. Where $R_5$ s cycloalkyloxycarbonylamino or alkyl substituted cycloalkyloxycarbonylamino, the cycloalkyl is preferably cyclohexyl; the preferred alkyl-substituted cycloalkyloxycarbonylamino group is tert.-butyl cyclohexyloxycarbonylamino, the para substituted group being preferred. Where $R_5$ is alkylsulphonylamino, the alkyl group is preferably methyl or ethyl, with methyl being most preferred.

Where $R_6$ and/or $R_7$ signifies $(C_{1-4})$alkyl, such alkyl is preferably ethyl.

Preferably, $R_1$ is $R_1'$, wherein $R_1'$ is $-CH_2CH_2OH$, $-CH_2COCH_3$ or $-CH_2CHOHCH_2OH$, more preferably $-CH_2CH_2OH$ or $-CH_2COCH_3$, with $-CH_2CH_2OH$ being most preferred.

$R_2$ is preferably $R_2'$, where $R_2'$ is chlorine, bromine, iodine or cyano, more preferably $R_2'$ is $R_2''$, where $R_2''$ is chlorine, bromine or iodine, with chlorine and bromine being most preferred.

Preferably, one of $R_3$ and $R_3'$ is hydrogen and the other is hydrogen, chlorine or bromine. More preferably $R_3$ is hydrogen, chlorine or bromine and $R_3'$ is hydrogen, and most preferably both $R_3$ and $R_3'$ are hydrogen.

$R_4$ is preferably $R_4'$, where $R_4'$ is hydrogen, methoxy or ethoxy, more preferably hydrogen.

$R_5$ is preferably $R_5'$, where $R_5'$ is chlorine, bromine, cyano, methyl, methoxy, ethoxy, formylamino, $(C_{1-4})$alkylcarbonylamino, $(C_{1-4})$alkylcarbonylamino substituted by up to two substituents selected from chlorine, bromine and hydroxy or monosubstituted by cyano, $(C_{1-2})$alkoxy, benzyloxy, phenyl or phenoxy; $(C_{1-4})$alkoxycarbonylamino, chloro- or bromo$(C_{1-4})$alkoxycarbonylamino; $(C_{1-2})$alkoxy$(C_{2-3})$alkoxycarbonylamino; methoxyethoxyethoxycarbonylamino; phenoxy$(C_{2-3})$alkoxycarbonylamino; benzyloxycarbonylamino; benzoylamino; toluylcarbonylamino; phenoxycarbonylamino; allyloxycarbonylamino; trifluoroacetylamino; para-tert.butylcyclohexyloxycarbonylamino; dioxanylmethoxycarbonylamino; vinylcarbonylamino; methylvinylcarbonylamino; allylcarbonylamino; or methylsulphonylamino. Chlorine, bromine, cyano, methyl, methoxy and ethoxy are the less preferred significances of $R_5'$. More preferably, $R_5$ is $R_5''$, where $R_5''$ is $(C_{1-2})$alkylcarbonylamino; $(C_{1-2})$alkylcarbonylamino monosubstituted by hydroxy, chlorine, bromine or $(C_{1-2})$alkoxy; $(C_{1-2})$alkoxycarbonylamino, methoxyethoxycarbonylamino, ethoxyethoxycarbonylamino, vinylcarbonylamino, allylcarbonylamino, allyloxycarbonylamino, α- or β-methylvinylcarbonylamino, benzoylamino, phenoxycarbonylamino, trifluoroacetylamino, formylamino or methylsulfonylamino. Even more preferably, $R_5$ is $R_5'''$, where $R_5'''$ is acetylamino, propionylamino, chloroacetylamino, bromoacetylamino, chloropropionylamino, bromopriopionylamino, methoxyacetylamino, ethoxyacetylamino, methoxypropionylamino, ethoxypropionylamino, vinylcarbonylamino, allylcarbonylamino, α- or β-methylvinylcarbonylamino, methoxycarbonylamino, ethoxycarbonylamino, methoxyethoxycarbonylamino, ethoxyethoxycarbonylamino or allyloxycarbonylamino. Most preferably, $R_5$ is $R_5^{iv}$, where $R_5^{iv}$ is acetylamino, propionylamino, methoxyacetylamino or ethoxyacetylamino.

$R_6$ and $R_7$, independently, are preferably $R_6'$ and $R_7'$, where $R_6'$ and $R_7'$ are ($C_{1-4}$)alkyl and more preferably they are identical. Most preferably they are both ethyl.

Preferred compounds of formula I are those wherein $R_2$ is halogen and $R_5$ is acylamino, particularly those of this group wherein $R_1$ is $R_1'$; those of this group wherein $R_1$ is $R_1'$ and $R_2$ is chlorine, bromine or iodine are more preferred; and those of this group wherein $R_1$ is $R_1'$, $R_2$ is chlorine, bromine or iodine, one of $R_3$ and $R_3'$ is hydrogen, chlorine or bromine and the other of $R_3$ and $R_3'$ is hydrogen are still more preferred. Of the compounds of the last mentioned subgroup, those wherein $R_5$ is $R_5'$ excluding chlorine, bromine, cyano, methyl, methoxy and ethoxy are preferred; the compounds of this particular subgroup wherein $R_3$ and $R_3'$ are both hydrogen and the compounds of this particular subgroup wherein $R_2$ is chlorine or bromine are still more preferred. Representative compounds of the last-mentioned subgroup, i.e., those wherein $R_2$ is chlorine or bromine, include those wherein $R_1$ is $-CH_2CH_2OH$, those wherein $R_6$ is $C_{1-4}$alkyl and $R_7$ is $C_{1-4}$-alkyl, those wherein $R_4$ is hydrogen, methoxy or ethoxy (particularly hydrogen) and those wherein $R_5$ is $R_5'$ with the exception of methoxyethoxycarbonylamino, ethoxyethoxycarbonylamino, vinylcarbonylamino and allylcarbonylamino, with those wherein each of $R_4$, $R_5$, $R_6$ and $R_7$ has the indicated significances being of particular interest.

Preferred compounds of formula I are those where $R_1$ is $R_1'$, $R_2$ is $R_2'$, one of $R_3$ and $R_3'$ is hydrogen and the other is hydrogen, chlorine or bromine, and $R_5$ is $R_5'$.

More preferred compounds are those where $R_1$ is $R_1'$, $R_2$ is $R_2''$, one of $R_3$ and $R_3'$ is hydrogen and the other is hydrogen, chlorine or bromine, and $R_5$ is $R_5'$ or preferably $R_5'$, with $R_4$ preferably being $R_4'$.

The compounds of formula Ia

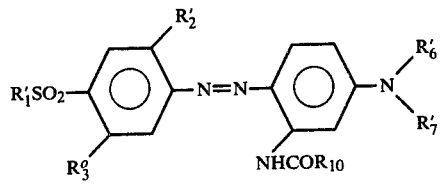

(Ia), wherein
$R_1'$ is $-CH_2CH_2OH$ or $-CH_2COCH_3$,
$R_2'$ is chlorine or bromine,
$R_3°$ is hydrogen, chlorine or bromine,
$R_6'$ is $C_{1-4}$alkyl, $R_7'$ is $C_{1-4}$alkyl, and
$R_{10}$ is methyl, ethyl, chloromethyl, bromoethyl, chloroethyl, bromoethyl, methoxymethyl, ethoxymethyl, methoxyethyl, ethoxyethyl, methoxy, ethoxy, methoxyethoxy, ethoxyethoxy, allyloxy, vinyl methylvinyl or allyl.

are of particular interest. The preferred compounds of formula Ia are those wherein $R_6'$ and $R_7'$ are identical, with those wherein $R_1$ is $-CH_2CH_2OH$, $R_6'$ is ethyl, $R_7'$ is ethyl and $R_{10}$ is methyl, ethyl, methoxymethyl or ethoxymethyl being more preferred.

Another group of preferred compounds of formula I are those wherein $R_1$ is $-NR_8R_9$ and $R_5$ is $R_5''$. Of these, those compounds where $R_2$ is chlorine or bromine, $R_3$ is hydrogen, chlorine or bromine, $R_3'$ is hydrogen, and $R_6$ and $R_7$, independently, are $R_6'$ and $R_7'$ are preferred with those wherein $R_5''$ is $R'''$ being more preferred and those wherein $R''$ is $R_5^{iv}$ being most preferred, especially when $R_9$ is hydrogen.

The present invention also provides a process for the production of compounds of formula I, as defined above, comprising (a) coupling the diazonium compound obtained from an amine of formula II,

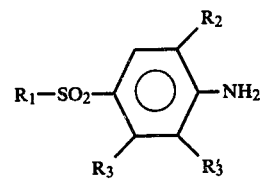

in which $R_1$, $R_2$, $R_3$ and $R_3'$ are as defined above, with a compound of formula III,

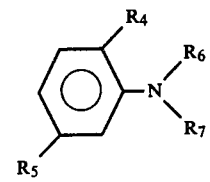

in which $R_4$ to $R_7$ are as defined above, or (b) condensing a compound of formula I, in which $R_2$ is halogen and $R_3'$ is hydrogen with, a salt of hydrocyanic acid to obtain a compound of formula I wherein $R_2$ is cyano and $R_3'$ is hydrogen.

The diazotization and coupling reactions may be carried out in accordance with known methods.

Process (b) may also be carried out in accordance with conventional methods. A suitable salt of hydrocyanic acid is Cu-I-cyanide.

Compounds of formula II wherein $R_1$ is $R_1^v$, wherein $R_1^v$ is $-CH_2COCH_3$, $-CH_2COC_6H_5$ or $-CH_2COC_6H_4Br$, may be produced for example by condensing a compound of the formula

$R_1^v-Hal$ in which
Hal is chlorine, bromine or iodine, and
$R_1^v$ is as defined above,
with a compound of formula IV

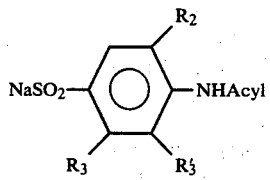

in which $R_2$, $R_3$ and $R_3'$ and Acyl are as defined above, (the preferred acyl being acetyl),
preferably in a 1:1 molar ratio, followed by saponification of the acylamino group.

The condensation reaction is conveniently conducted in an inert solvent, for example, water or dioxane. A suitable reaction temperature is in the range from 20° to 100° C., preferably from 20° to 85° C. Saponification may be carried out in known manner, preferably by acidifying with a dilute mineral acid.

Compounds of formula II wherein $R_1$ is hydroxyethyl may be produced by reacting the free acid of a compound of formula IV, as defined above, with the corresponding alkylene oxide followed by saponification of the acylamino group.

The reaction of the free acid of the compound of formula IV and the alkylene oxide may be carried out in analogy with known methods. Saponification may be effected as described above.

Compounds of formula II, wherein $R_1$ is $-NR_8R_9$ may be prepared by condensing an amine of the formula

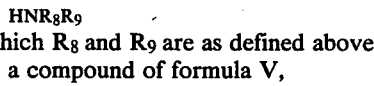

in which $R_8$ and $R_9$ are as defined above, with a compound of formula V,

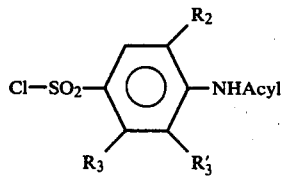

in which $R_2$, $R_3$, $R_3'$ and Acyl are as defined above, (the preferred Acyl being acetyl)
followed by saponification of the acylamino group. The condensation may be carried out in an inert solvent, for example, water or dioxane. Suitable reaction temperatures are in the range from 0° to 50° C.

The compounds of formulae III, IV and V are known or may be prepared in conventional manner from known starting materials.

The compounds of formula I are useful as disperse dyes; they may be converted into dyeing preparations according to known methods, for example by grinding in the presence of dispersing agents and/or fillers. The dyestuff preparation may be vacuum or comminution dried and used for dyeing from a long or short bath or for pad-dyeing or printing.

The dyestuffs may be obtained in polymorpheric, thermo-instable form. If such is the case they are advantageously modified by one of the following methods to their thermostable form:

(a) Stirring in water at temperatures of between 20° and 100° C., preferably at 50° to 100° C., in the presence or absence of a surfactant or an organic solvent which is either water insoluble or soluble, for 5 to 300 minutes (as a rule 15 to 45 minutes suffices);

(b) as (a) above but in an autoclave at 100° to 150° C., preferably at 125°–135° C., (c) by vacuum drying or drying at normal pressure at a temperature between 50° and 140° C., preferably between 100° and 140° C., (d) by recrystallization from an organic solvent, (e) after coupling has been completed, by heating the reaction mixture to 50° to 100° C., preferably to 60° to 90° C., the pH having being adjusted to from 4 to 7 to avoid saponification; or (f) in exceptional cases, stabilisation may be effected by grinding the dyestuff in the presence of water and dispersing agents, with subsequent heating to 50° to 100° C., preferably to 60° to 90° C., care being taken that the heating does not cause enlargement of the particles.

By carrying out the coupling reaction in the presence of surfactants or organic solvents, the formation of thermoinstable crystal modifications can, in many cases, be avoided.

By effecting any of procedures (a) to (f) as described above, the following advantages, among others, may be obtained:

(i) improvement in dispersibility (in most cases the production of sufficiently thermostable dispersions at dyeing temperature is only possible with thermostable ["heat treated"] pigments), (ii) improvement in build-up, (iii) increase in the dry content of the press-cakes (often important in the production of liquid dye preparations).

From an aqueous suspension the dyestuffs may be used for dyeing or printing substrates consisting of or comprising synthetic or semi-synthetic, hydrophobic, high molecular weight organic materials. As examples of such substrates may be given linear, aromatic polyesters, cellulose 2½ acetate, cellulose triacetate and where the compound of formula I contains at least one hydroxy group in $R_1$, also synthetic polyamides. The substrate may be in loose fibre, yarn or fabric form. Dyeing or printing may be effected in accordance with known methods, for example as described in French Pat. No. 1,445,371.

The dyeings obtained have notable light fastness, fastness to thermofixation, sublimation and pleating, wet fastnesses, for example, wash fastness, sweat fastness, fastness to solvents, especially fastness to dry cleaning, crossdyeing, ozone, gas fumes, chlorine and rubbing. They possess notable resistance to various permanent-press processes, to the so called "soil-release" finishes and to reduction (when dyeing wool-containing blends). They reserve wool and cotton.

The following Examples further illustrate the invention. In the Examples the parts and percentages are by weight and the temperatures are in degrees Centigrade.

EXAMPLE 1

(a) Production of the Diazo Component

234 Parts of 4-acetylamino-3-chlorobenzenesulphinic acid are added to a solution of 800 parts of water and 48 parts of sodium hydroxide. The temperature rises from 25° to about 45°. 100 parts of ethylene chlorohydrin are added over the course of 20–30 minutes to the suspension and a brownish solution is produced. The reaction mixture is stirred for 3 hours at reflux temperature (87°

C.). Subsequently, it is allowed to cool to room temperature; the product which is precipitated in crystalline from is filtered off and washed with a little water.

The filter residue is boiled for 45 minutes at reflux in a mixture consisting of 800 parts of water and 500 parts of concentrated hydrochloric acid. 5 parts of decolourising carbon are added to the resultant solution which is stirred for a few more minutes and then filtered. The clear-filtered solution is adjusted to a volume of 2000 ml with water.

(b) Production of the Dyestuff 200 ml of the solution obtained as described above are cooled to 0° by adding 100 parts of ice thereto and then diazotised with a solution of 6.9 parts of sodium nitrite in 50 ml of water in 30 to 60 minutes. Stirring is continued for another 30 minutes, 5 parts of amino-sulphonic acid are added thereto and the solution obtained is then filtered. The diazonium salt solution thus obtained is slowly added to a mixture of 20.6 parts of 3-acetylamino-1-N,N-diethylaminobenzene, 50 parts of glacial acetic acid and 100 parts of ice. Then sodium acetate is added until a pH of 2.0 to 2.5 is reached and stirring is continued for a further 1 to 2 hours at 0°–5° until coupling is completed. The dyestuff formed is filtered off, washed with water, then rinsed with 1000 parts of water in an autoclave and stirred for 2 hours at 130°. After cooling to room temperature, the dyestuff is filtered off and dried.

The dyestuff thus obtained corresponds to the formula

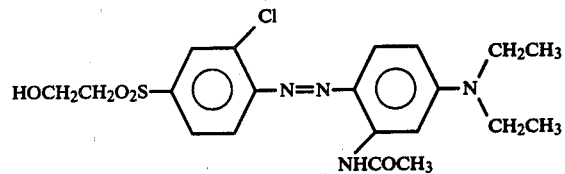

and dyes synthetic fibres in bright red shades with very good fastness.

EXAMPLE 2

6.9 Parts of powdered sodium nitrite are added with vigorous stirring at 60° to 70° to 100 parts of concentrated sulphuric acid. Stirring is continued for 10 minutes at 60°, then the solution is cooled to 10°. At a temperature of 10°–15°, 100 parts of glacial acetic acid are slowly added, followed by 24.7 parts of the compound of the formula

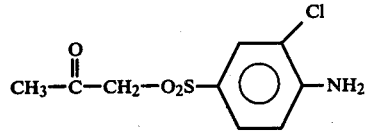

and 100 parts of glacial acetic acid. The solution is stirred for 2 hours and the diazonium salt solution obtained is poured onto a mixture of 20.6 parts of 3-acetylamino-1-N,N-diethylaminobenzene, 50 parts of glacial acetic acid, 300 parts of ice and 10 parts of amido-sulphonic acid. Coupling is brought to an end in an acid medium by adjusting the pH 2.0–2.5 with sodium acetate. The dyestuff is formed immediately and is precipitated. It is filtered, washed until acid-free and dried.

The dyestuff obtained of the formula

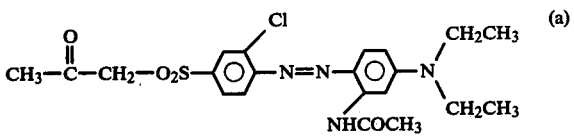

dyes synthetic fibres in brilliant red shades with excellent fastness.

When suspended in 200 parts of dimethylformamide, 46.5 parts of this dyestuff may be heated to 130°, with stirring, for 180 minutes together with 10.4 parts of Cu-I-cyanide whereby the corresponding 2-cyano substituted dyestuff is obtained. These dyestuffs also dye polyester fibre material in red shades with good fastness.

TABLE 1

| In the Examples of this Table, $R_1$ is —$CH_2CH_2OH$, $R_3'$ and $R_4$ are hydrogen and $R_5$ is —$NHCOR_{10}$. | | | | | |
|---|---|---|---|---|---|
| Example No. | $R_2$ | $R_3$ | $R_6$ | $R_7$ | $R_{10}$ |
| 3 | Br | H | —$C_2H_5$ | —$C_2H_5$ | —$CH_3$ |
| 4 | Cl | H | " | " | —$C_2H_5$ |
| 5 | Cl | H | " | " | —$CH_2CH_2CH_3$ |
| 6 | Cl | H | " | " | H |
| 7 | Br | H | " | " | —$CH_2OH$ |
| 8 | Cl | H | " | " | —$CH_2OCH_3$ |
| 9 | Br | H | " | " | —$CH_2OC_2H_5$ |
| 10 | Cl | H | " | " | —$CH_2OC_6H_5$ |
| 11 | Cl | Cl | " | " | —$CH_2OCH_2C_6H_5$ |
| 12 | Cl | Cl | " | " | —$CH_2CH_2Cl$ |
| 13 | Cl | Cl | " | " | —$CHClCH_3$ |
| 14 | Cl | Cl | " | " | —$CH_2CH_2Br$ |
| 15 | Br | Br | " | " | —$CF_3$ |
| 16 | Cl | Cl | " | " | —$CHOHCH_3$ |
| 17 | Cl | Cl | " | " | —$C_6H_5$ |
| 18 | Cl | Cl | " | " | —C$_6$H$_4$—CH$_3$ |
| 19 | Cl | Cl | " | " | —$CH_2OCH_2CH_2CH_3$ |
| 20 | Br | H | " | " | —$CH_2C_6H_5$ |
| 21 | Cl | H | " | " | —C$_6$H$_4$—CH$_3$ |
| 22 | Cl | Cl | " | " | —$CH_2CN$ |
| 23 | I | H | $nC_3H_7$ | $nC_3H_7$ | " |

TABLE 1-continued

In the Examples of this Table, $R_1$ is —$CH_2CH_2OH$, $R_3'$ and $R_4$ are hydrogen and $R_5$ is —$NHCOR_{10}$.

| Example No. | $R_2$ | $R_3$ | $R_6$ | $R_7$ | $R_{10}$ |
|---|---|---|---|---|---|
| 24 | Br | Br | —$C_2H_5$ | —$C_2H_5$ | —$OCH_3$ |
| 25 | Br | Br | " | " | —$OC_2H_5$ |
| 26 | Cl | H | " | " | —$OCH_2CH_2Cl$ |
| 27 | Cl | H | " | " | —$OCH_2CH_2OCH_3$ |
| 28 | Cl | Cl | " | " | —$OCH_2CH_2OC_2H_5$ |
| 29 | Cl | H | " | " | —$OCH_2CH_2OCH_2CH_2OCH_3$ |
| 30 | Cl | H | " | " | —$OCH_2C_6H_5$ |
| 31 | Cl | Cl | " | " | —$OCH_2CH(CH_3)_2$ |
| 32 | Cl | Cl | " | " | —$CH_2CH_2OH$ |
| 33 | Cl | Cl | " | " | —$CH_2CHCl_2$ |
| 34 | Cl | Cl | —$CH_2CH=CH_2$ | " | —$CH_3$ |
| 35 | Br | H | $nC_3H_7$ | $nC_3H_7$ | " |
| 36 | Cl | H | $nC_4H_9$ | $nC_4H_9$ | " |
| 37 | Cl | H | —$C_2H_5$ | —$CH_2C_6H_5$ | " |
| 38 | Cl | H | —$CH_3$ | —$CH_3$ | " |
| 39 | Cl | H | —$C_2H_5$ | —$CH_2CH_2C_6H_5$ | " |
| 40 | Cl | H | —$CH_2CH=CH_2$ | —$CH_2C_6H_5$ | " |
| 41 | Cl | Cl | —$C_2H_5$ | —$C_2H_5$ | —$CH_2$—$CH=CH_2$ |
| 42 | Cl | Cl | " | " | —$CH_2OC_2H_5$ |
| 43 | Cl | Cl | " | " | —$C_2H_5$ |
| 44 | Cl | Cl | " | " | —$OCH_2$—$CH=CH_2$ |
| 45 | Cl | H | " | " | —$C_6H_5$ |
| 46 | Cl | Cl | " | " | —$CH_2OC_6H_5$ |
| 47 | Cl | Cl | " | " | —O—⟨H⟩—$C(CH_3)_3$ |
| 48 | Cl | Cl | " | " | 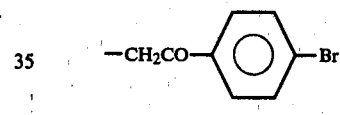 |
| 49 | Cl | Cl | $nC_3H_7$ | $nC_3H_7$ | —$CH_3$ |
| 50 | Cl | H | " | " | —$CH_2OCH_2CH_3$ |

Similar dyes may also be produced by replacing $R_1$ of Examples 1 and 2 and of the dyes of Table 1 by —$CH_2CHOHCH_2OH$; —$CH_2COCH_3$, —$CH_2COC_6H_5$, —$CH_2CO$—⟨○⟩—Br or —$NHCH_2CH_2CH_2OH$. They dye polyester fibres in similar red shades.

TABLE 2

In the Examples of this Table $R_1$ is —$NR_8R_9$, $R_3'$ and $R_4$ are hydrogen, $R_6$ and $R_7$ are —$C_2H_5$ and $R_5$ is —$NHCOR_{10}$.
All dyes wherein $R_2$ is Cl or Br give dyeings of red shades on polyester; the rest give dyeings of bluish-red shades.

| Example No. | $R_2$ | $R_3$ | $R_8$ | $R_9$ | $R_{10}$ |
|---|---|---|---|---|---|
| 51 | Cl | H | —$CH_3$ | —$CH_2CH_2OH$ | —$CH_3$ |
| 52 | Br | Br | —$C_2H_5$ | " | —$C_2H_5$ |
| 53 | Cl | Cl | " | " | —$CH_2OCH_3$ |
| 54 | Br | H | —$CH_2CH_2CN$ | " | —$OC_2H_5$ |
| 55 | —CN | H | —$C_2H_5$ | " | —$OCH_3$ |
| 56 | " | Cl | " | " | —$CH_2CH_2Cl$ |
| 57 | " | Br | " | " | —$OCH_2C_6H_5$ |
| 58 | " | Cl | —$CH_2CH_2CN$ | " | —$CH_3$ |
| 59 | " | H | —$C_2H_5$ | " | —$CH_2OH$ |
| 60 | " | Cl | " | " | —$CH_2OC_6H_5$ |
| 61 | " | Cl | " | " | —$OCH_2C_6H_5$ |
| 62 | " | Cl | —$CH_2CH_2CN$ | " | —$C_2H_5$ |
| 63 | " | H | —$C_2H_5$ | " | " |
| 64 | " | Br | " | " | —$CH_2OC_2H_5$ |
| 65 | " | Cl | —$CH_2CH_2CN$ | " | —$C_2H_5$ |
| 66 | " | H | —$C_2H_5$ | " | —$CF_3$ |

TABLE 3

In the Examples of this Table, $R_1$ is —$CH_2CH_2OH$.

| Example No. | $R_2$ | $R_3$ | $R_3'$ | $R_4$ | $R_5$ | $R_6$ | $R_7$ | shade on polyester |
|---|---|---|---|---|---|---|---|---|
| 67 | Cl | H | H | H | —$CH_3$ | —$C_2H_5$ | —$C_2H_5$ | orange |
| 68 | Br | H | H | H | —$OCH_3$ | " | " | " |
| 69 | Cl | H | H | H | —Cl | " | " | " |
| 70 | Cl | H | H | H | —Br | " | " | " |

TABLE 3-continued

In the Examples of this Table, $R_1$ is $-CH_2CH_2OH$.

| Example No. | $R_2$ | $R_3$ | $R'_3$ | $R_4$ | $R_5$ | $R_6$ | $R_7$ | shade on polyester |
|---|---|---|---|---|---|---|---|---|
| 71 | Cl | H | H | H | $-CN$ | " | " | " |
| 72 | Cl | H | Cl | H | $-CH_3$ | " | " | " |
| 73 | Br | H | Br | H | " | " | " | " |
| 74 | Br | H | Br | $-OCH_3$ | $-OCH_3$ | " | " | " |
| 75 | Cl | H | Cl | " | " | " | $-CH_2-C_6H_5$ | " |
| 76 | Cl | H | Cl | $-CH_3$ | " | " | " | " |
| 77 | Cl | Cl | H | $-OCH_3$ | " | " | " | scarlet red |
| 78 | Cl | Cl | H | Cl | $-CH_3$ | " | $-C_2H_5$ | " |
| 79 | Cl | Cl | H | Br | " | " | " | " |
| 80 | Br | Br | H | H | " | $-CH_2CH=CH_2$ | $-CH_2-CH=CH_2$ | " |
| 81 | Cl.Cl | H | H | | " | $-C_3H_7$ | $-C_3H_7$ | " |
| 82 | Cl | Cl | H | H | " | $-C_4H_9$ | $-C_4H_9$ | " |
| 83 | Cl | Cl | H | H | " | " | $-CH_2CH_2-C_6H_5$ | " |
| 84 | Cl | Cl | H | H | " | " | $-CH_2-C_6H_5$ | " |
| 85 | Cl | Cl | H | H | " | $-CH_3$ | " | " |
| 86 | Cl | Cl | H | H | $-CN$ | $-C_2H_5$ | $-C_2H_5$ | " |
| 87 | Cl | H | Cl | H | $-NHCOCH_3$ | " | " | orange |
| 88 | Cl | H | Cl | H | $-NHCOCH_2CH_3$ $\|\|$ $O$ | " | " | " |
| 89 | Cl | H | Cl | H | $-NHSO_2CH_3$ | " | " | " |

TABLE 4

In the Examples of this Table $R'_3$ is hydrogen, $R_5$ is $-NHCOR_{10}$ and $R_6$ and $R_7$ are $-C_2H_5$. All dyes give red shades on polyester fibres.

| Example No. | $R_1$ | $R_2$ | $R_3$ | $R_4$ | $R_{10}$ |
|---|---|---|---|---|---|
| 90 | $-CH_2CH_2OH$ | Cl | H | $-OCH_3$ | $-CH_3$ |
| 91 | " | Br | H | $-OC_2H_5$ | $-C_2H_5$ |
| 92 | " | Cl | Cl | " | $-OCH_2CH_2OCH_3$ |
| 93 | " | Cl | Cl | $-OCH_3$ | $-OCH_2CH_3$ |
| 94 | $-CH_2COCH_3$ | Cl | H | " | $-OCH_2CH_2OCH_2CH_3$ |
| 95 | " | Br | H | $-OCH_2CH_3$ | " |
| 96 | $-CH_2CH-CH_2-OH$ $\|$ $OH$ | Cl | H | " | $-CH_3$ |
| 97 | " | Cl | H | " | $-OCH_3$ |
| 98 | $-NHCH_2CH_2OH$ | Cl | Cl | " | " |
| 99 | " | Cl | Cl | " | $-CH_3$ |
| 100 | $-N(CH_2CH_2OH)_2$ | Cl | Cl | " | " |
| 101 | $-N-CH_2CH_2OH$ $\|$ $CH_2CH_3$ | Cl | Cl | " | " |
| 102 | $-N(CH_2CHCH_3)_2$ $\|$ $OH$ | Cl | Cl | " | " |
| 103 | $-NHCH_2CH_2OH$ | Cl | Cl | H | " |
| 104 | " | Cl | Cl | H | $-C_2H_5$ |
| 105 | " | Cl | Cl | H | $-CH_2CH_2Cl$ |
| 106 | $-CH_2COCH_3$ | Cl | H | H | $-OCH_2CH(CH_3)_2$ |
| 107 | " | Cl | H | H | $-OCH_2CH=CH_2$ |
| 108 | " | Cl | Cl | H | $-O-CH_2CH=CH_2$ |

APPLICATION EXAMPLE A

18 Parts of the dyestuff produced as described in Example 1 are ground to a fine powder in a ball mill for 48 hours with 11.1 parts of sodium-dinaphthylmethanedisulfonate, 11.1 parts of sodium cetyl sulphate and 13.9 parts of anhydrous sodium sulphate. 1.5 parts of the dye preparation thus obtained are dispersed in 3000 parts of water containing 3 parts of a 30% solution of a highly sulphonated castor oil and 20 parts of an emulsion of a chlorinated benzene in water. 100 parts of polyester fibre fabric are entered into the bath at 20°-25°, the bath is heated to 95°-100° in about 30 minutes and dyeing takes place for 1 hour at this temperature. The dyed fabric is removed from the bath, rinsed, soaped for 15 minutes at 70° with a 0.1% solution of an alkylphenyl-polyglycol ether, rinsed again and then dried. A bright red dyeing with excellent fastness properties is obtained.

APPLICATION EXAMPLE B 11.7 g of the dyestuff (a) produced as described in Example 2 and 19.3 g of a commercial lignin sulphonate are ground for 2-8 hours at 2000-5000 revolutions per minute in 10-15 ml of water with 100 g of siliquartzite pearls and a double-plate stirrer. The ground deposit is diluted with about 30 ml of water and is filtered through a glass suction filter G 1 into a 1000 ml pear-shaped flask. The dyestuff and dispersion agent particles adhering to the siliquartzite pearls are rinsed quantitatively with as little water as possible into the pear-shaped flask. The dispersion thus obtained is set at a pH of 6-6.5 using 10% phosphoric acid and is then evaporated until dry on the rotary evaporator with a maximum external temperature of 60°.

100 g of purified polyester fibre material "Terylene" (Registered Trade Mark) are added to 2 g of the dye preparation thus obtained in 1000 ml of water at 40°-50°, and this is heated slowly. Dyeing takes place for about 60 minutes under pressure at 130° C. and after rinsing, soaping, rinsing and drying, a red dyeing with excellent fastness properties is obtained.

APPLICATION EXAMPLE C

An aqueous, finely-dispersed suspension of 10 parts of the dyestuff of Example 28 (produced in analagous manner to that described in Example 1), 20 parts of sodium dinaphthylmethane-disulfonate and 3 parts of sodium alginate is made up to 1000 parts with water and mixed well. A polyester fabric is pad-dyed at 20° with the padding liquor obtained, squeezed out to a water content of 70%, dried by air at 60°-100° and subsequently treated with hot, dry air at 230° for 60 seconds. The fabric is then rinsed, soaped, rinsed again and dried. A red dyeing with excellent fastness properties is obtained.

APPLICATION EXAMPLE D 10.5 g of the dyestuff of Example 1 and 19.5 g of a commercial lignin sulphonate are ground in a 200 ml beaker at 20°-30° for 2-8 hours at 2000-2500 revolutions per minute in 10-15 ml of water, with 100 g of siliquartzite pearls and a double-plate stirrer. The ground deposit is diluted with about 30 ml of water and is filtered through a glass suction filter G 1 into a 1000 ml pear-shaped flask. The dyestuff and dispersion agent particles adhering to the siliquartzite pearls are rinsed quantitatively with as little water as possible into the pear-shaped flask. The dispersion thus obtained is set at a pH of 6-6.5 with 10% phosphoric acid and is then evaporated until dry in a rotary evaporator with a maximum external temperature of 60°. A solution of 3 parts of $Na_3PO_4.10H_2O$ in 4000 parts of water is set at a pH of 9 with $NaH_2PO_4$, and then 1 part of an addition product of 25 mols of ethylene oxide on 1 mol of oleyl alcohol is added. To this solution are added firstly 1 part of the dye preparation obtained as above and then 100 parts of nylon carpet fabric (Du Pont Nylon 846). The bath is heated over the course of 30 minutes to 98°, dyeing takes place for 60 minutes at 98°, then the dyed fabric is removed from the bath, rinsed with warm, then with cold water and dried. A red dyeing with excellent fastness is obtained.

APPLICATION EXAMPLE E

20 Parts of the dyestuff of Example 42 (produced in an analagous manner to that described in Example 1), 55 parts of sulphite cellulose waste powder and 800 parts of water are ground in a ball mill until the size of the dyestuff particles is below 1μ.

The colloidal-dispersed solution obtained is mixed with 25 parts of 1-β-hydroxyethoxy-2-n-butoxyethane and 400 parts of 6% carboxymethyl cellulose. This printing paste is eminently suitable for vigoureux printing on polyester combed material. Printing is effected with two rollers (covering 78%), after which there is steam-treatment at 120° without intermediate drying. Red prints with good fastness are obtained.

What I claim is:

1. A compound of the formula

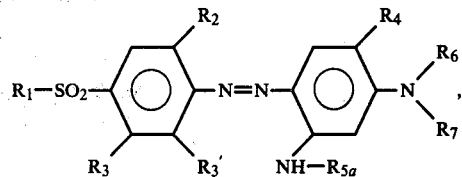

wherein
$R_1$ is $—CH_2CH_2OH$, $—CH_2CHOHCH_2OH$, $—CH_2COCH_3$, $—CH_2COC_6H_5$, $—CH_2COC_6H_4Br$ or $—NR_8R_9$, wherein
 $R_8$ is $C_{2-3}$hydroxyalkyl, and
 $R_9$ is hydrogen, $C_{1-4}$alkyl, $C_{2-3}$hydroxyalkyl or cyano($C_{1-2}$alkyl),
$R_2$ is halo,
$R_3$ is hydrogen or halo,
$R_3'$ is hydrogen or halo, with the proviso that at least one of $R_3$ and $R_3'$ is hydrogen,
$R_4$ is hydrogen, chloro, bromo, methyl, methoxy or ethoxy,
$R_{5a}$ is formyl; ($C_{1-4}$alkyl)carbonyl; ($C_{1-4}$alkyl)carbonyl monosubstituted by chloro, bromo, hydroxy, cyano, $C_{1-4}$alkoxy, ($C_{1-2}$alkoxy)-$C_{2-4}$ alkoxy, benzyloxy, phenyl or phenoxy; ($C_{1-4}$alkyl)carbonyl substituted by two substituents selected from the group consisting of chloro, bromo and hydroxy; ($C_{1-4}$alkoxy)carbonyl; ($C_{1-4}$alkoxy)carbonyl monosubstituted by chloro, bromo, hydroxy, cyano, $C_{1-4}$alkoxy, ($C_{1-2}$alkoxy)$C_{2-4}$alkoxy, benzyloxy, phenyl or phenoxy; ($C_{1-4}$alkoxy)carbonyl substituted by two substituents selected from the group consisting of chloro, bromo and hydroxy; benzoyl; ($C_{1-2}$alkyl)benzoyl; phenoxycarbonyl; ($C_{2-4}$alkenyl)oxycarbonyl; trifluoroacetyl; ($C_{5-7}$cycloalkyl)oxycarbonyl; ($C_{1-4}$alkyl)($C_{5-7}$cycloalkyl)oxycarbonyl; dioxanylmethoxycarbonyl; ($C_{2-4}$alkenyl)carbonyl or $C_{1-4}$alkylsulfonyl,
$R_6$ is $C_{1-4}$alkyl or $C_{2-4}$alkenyl, and
$R_7$ is $C_{1-4}$alkyl, $C_{2-4}$alkenyl or phenyl($C_{1-2}$alkyl),
with the proviso that the molecule is free of

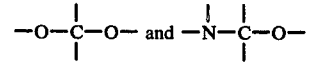

radicals.

2. The compound according to claim 1 wherein $R_1$ is $—CH_2CH_2OH$, $—CH_2COCH_3$ or $—CH_2CHOHCH_2OH$.

3. A compound according to claim 2 wherein $R_2$ is chloro, bromo or iodo.

4. A compound according to claim 3 wherein
$R_3$ is hydrogen, chloro or bromo, and
$R_3'$ is hydrogen, chloro or bromo, with the proviso that at least one of $R_3$ and $R_3'$ is hydrogen.

5. A compound according to claim 4 wherein $R_{5a}$ is formyl; ($C_{1-4}$alkyl)carbonyl; ($C_{1-4}$alkyl)carbonyl monosubstituted by chloro, bromo, hydroxy, cyano, $C_{1-2}$alkoxy, benzyloxy, phenyl or phenoxy; ($C_{1-4}$alkyl)carbonyl substituted by two substituents selected from the group consisting of chloro, bromo and hydroxy; ($C_{1-4}$alkoxy)carbonyl; ($C_{1-4}$chloroalkoxy)carbonyl; ($C_{1-4}$bromoalkoxy)carbonyl; ($C_{1-2}$alkoxy)($C_{2-3}$alkoxy)carbonyl; methoxyethoxyethoxycarbonyl; phenoxy($C_{2-3}$alkoxy)carbonyl; benzyloxycarbonyl; bednzoyl; tolylcarbonyl; phenoxycarbonyl; allyloxycarbonyl; trifluoroacetyl; 4-t-butylcyclohexyloxycarbonyl; dioxanylmethoxycarbonyl; vinylcarbonyl; methylvinylcarbonyl; allylcarbonyl or methylsulfonyl.

6. A compound according to claim 5 wherein
$R_3$ is hydrogen, and
$R_3'$ is hydrogen.

7. A compound according to claim 5 wherein $R_2$ is chloro or bromo.

8. A compound according to claim 7 wherein $R_1$ is $—CH_2CH_2OH$.

9. A compound according to claim 7 wherein
$R_6$ is $C_{1-4}$alkyl, and
$R_7$ is $C_{1-4}$alkyl.

10. A compound according to claim 7 wherein $R_4$ is hydrogen, methoxy or ethoxy.

11. A compound according to claim 10 wherein $R_4$ is hydrogen.

12. A compound according to claim 7 wherein $R_{5a}$ is formyl; $(C_{1-2}alkyl)$carbonyl; $(C_{1-2}alkyl)$carbonyl monosubstituted by chloro, bromo, hydroxy or $C_{1-2}$alkoxy; $(C_{1-2}alkoxy)$carbonyl; benzoyl; phenoxycarbonyl; allyloxycarbonyl; trifluoroacetyl; methylvinylcarbonyl or methylsulfonyl.

13. A compound according to claim 12 wherein $R_4$ is hydrogen, methoxy or ethoxy.

14. A compound according to claim 13 wherein $R_4$ is hydrogen.

15. A compound according to claim 13 wherein
$R_6$ is $C_{1-4}$alkyl, and
$R_7$ is $C_{1-4}$alkyl.

16. A compound according to claim 1 wherein $R_1$ is $—NR_8R_9$.

17. A compound according to claim 16 wherein $R_{5a}$ is formyl; $(C_{1-2}alkyl)$carbonyl; $(C_{1-2}alkyl)$carbonyl monosubstituted by chloro, bromo, hydroxy or $C_{1-2}$alkoxy; $(C_{1-2}alkoxy)$carbonyl; methoxyethoxycarbonyl; ethoxyethoxycarbonyl; benzoyl; phenoxycarbonyl; allyloxycarbonyl; trifluoroacetyl; vinylcarbonyl; methylvinylcarbonyl; allylcarbonyl or methylsulfonyl.

18. A compound according to claim 17 wherein
$R_2$ is chloro or bromo,
$R_3$ is hydrogen, chloro or bromo,
$R_3'$ is hydrogen,
$R_6$ is $C_{1-4}$alkyl, and
$R_7$ is $C_{1-4}$alkyl.

19. A compound according to claim 18 wherein $R_{5a}$ is acetyl, propionyl, chloroacetyl, bromoacetyl, chloropropionyl, bromopropionyl, methoxyacetyl, ethoxyacetyl, methoxypropionyl, ethoxypropionyl, methoxycarbonyl, ethoxycarbonyl, methoxyethoxycarbonyl, ethoxyethoxycarbonyl, allyloxycarbonyl, vinylcarbonyl, methylvinylcarbonyl or allylcarbonyl.

20. A compound according to claim 19 wherein $R_{5a}$ is acetyl, propionyl, methoxyacetyl or ethoxyacetyl.

21. A compound according to claim 19 wherein $R_4$ is hydrogen.

22. A compound according to claim 1 wherein $R_1$ is $—CH_2CH_2OH$, $—CH_2CHOHCH_2OH$, $—CH_2COCH_3$, $—CH_2COC_6H_5$ or $—CH_2COC_6H_4Br$.

23. A compound according to claim 22 having the formula

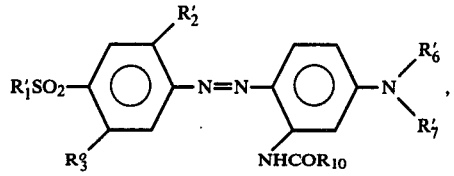

wherein
$R_1'$ is $—CH_2CH_2OH$ or $—CH_2COCH_3$,
$R_2'$ is chloro or bromo,
$R_3°$ is hydrogen, chloro or bromo,
$R_6'$ is $C_{1-4}$alkyl,
$R_7'$ is $C_{1-4}$alkyl, and
$R_{10}$ is methyl, ethyl, chloromethyl, bromomethyl, chloroethyl, bromoethyl, methoxymethyl, ethoxymethyl, methoxyethyl, ethoxyethyl, methoxy, ethoxy, methoxyethoxy, ethoxyethoxy, allyloxy, vinyl, methylvinyl or allyl.

24. A compound according to claim 23 wherein $R_6'$ and $R_7'$ are identical.

25. A compound according to claim 24 wherein
$R_1'$ is $—CH_2CH_2OH$,
$R_6'$ is ethyl,
$R_7'$ is ethyl, and
$R_{10}$ is methyl, ethyl, methoxymethyl or ethoxymethyl.

26. The compound according to claim 17 having the formula

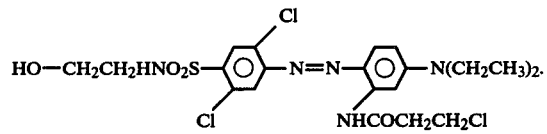

27. The compound according to claim 24 having the formula

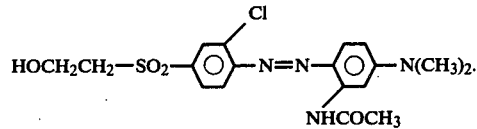

28. The compound according to claim 24 having the formula

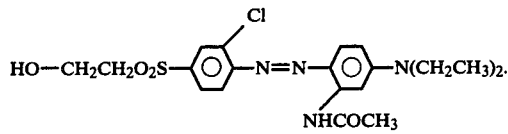

29. The compound according to claim 24 having the formula

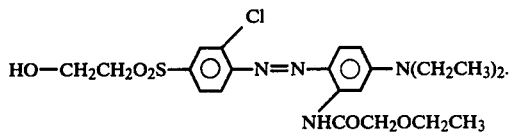

30. The compound according to claim 24 having the formula

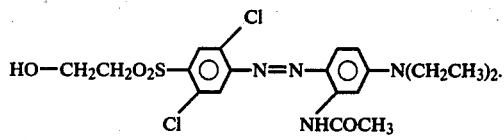
31. The compound according to claim 24 having the formula
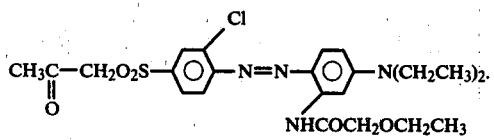
32. The compound according to claim 24 having the formula
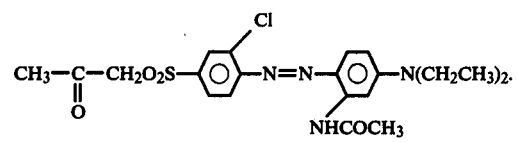
33. The compound according to claim 24 having the formula
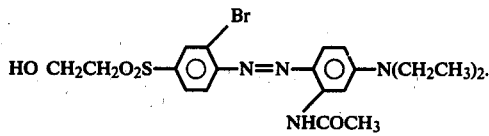
* * * * *

UNITED STATES PATENT AND TRADEMARK OFFICE
CERTIFICATE OF CORRECTION

PATENT NO. : 4,148,791

DATED : April 10, 1979

INVENTOR(S) : Ruedi Altermatt

It is certified that error appears in the above—identified patent and that said Letters Patent are hereby corrected as shown below:

In the Title, "SULFINYL" should read -- SULFONYL --. Abstract, line 28, "2/178" should read -- 2 1/2 --. Column 2, line 9, delete "or" (first occurrence). Column 2, line 22, "s" should read -- is --. Column 3, line 53, "$R_5'$," should read -- $R_5''$, --. Column 4, line 2, "bromoethyl," should read -- bromomethyl, --. Column 4, line 19, "R'''" should read -- $R_5'''$ --. Column 4, line 20, "R''" should read -- $R_5''$ -- and "$R'^v$" should read -- $R^{iv}$ --. Column 14, line 50, "The" should read -- A --.

Signed and Sealed this

Eighteenth Day of March 1980

[SEAL]

Attest:

SIDNEY A. DIAMOND

Attesting Officer

Commissioner of Patents and Trademarks